(12) United States Patent
Hall et al.

(10) Patent No.: US 10,397,291 B1
(45) Date of Patent: Aug. 27, 2019

(54) SESSION-SPECIFIC STREAMING CONTENT REPLACEMENT

(71) Applicant: Twitch Interactive, Inc., San Francisco, CA (US)

(72) Inventors: Cyrus Hall, San Francisco, CA (US); Daniel Lin, Mountain View, CA (US); Maciej Laszcz, San Francisco, CA (US); Luke Curley, San Francisco, CA (US); Matthew Louis Szatmary, Walnut Creek, CA (US); Abhinav Kapoor, Fremont, CA (US); Daniel Arthur McClain, Marshfield, MA (US); Diana Lu, San Francisco, CA (US); Scott Wang, San Francisco, CA (US); Spencer Nelson, Brooklyn, NY (US); Phillip Conover, San Francisco, CA (US); Scott Rabin, San Francisco, CA (US); Jorge Arturo Villatoro, San Francisco, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 115 days.

(21) Appl. No.: 15/472,600

(22) Filed: Mar. 29, 2017

(51) Int. Cl.
*H04L 29/06* (2006.01)
*H04L 29/08* (2006.01)
*G06F 3/0484* (2013.01)
*G06F 3/0482* (2013.01)

(52) U.S. Cl.
CPC ........ *H04L 65/4084* (2013.01); *H04L 65/601* (2013.01)

(58) Field of Classification Search
USPC .......................................................... 709/219
See application file for complete search history.

(56) References Cited

U.S. PATENT DOCUMENTS

| 5,838,389 | A | 11/1998 | Mical et al. |
| 7,257,309 | B1 | 8/2007 | Elswick et al. |
| 7,664,101 | B1 * | 2/2010 | Croak ..................... H04L 12/66 370/352 |

(Continued)

OTHER PUBLICATIONS

U.S. Appl. No. 15/472,628, filed Mar. 29, 2017, Hall et al.

(Continued)

*Primary Examiner* — Jude Jean Gilles
(74) *Attorney, Agent, or Firm* — BakerHostetler

(57) ABSTRACT

First streaming video content may be received from a provider. The provider may issue a request to replace part of the first streaming video content with replacement content, such as advertisements. Second streaming video content may be selected as a replacement for a first video player, while third streaming video content may be selected as a replacement for a second video player. Instructions may be sent to the first and the second video player to play a first portion of the first streaming video content, followed by their respective selected replacement content, followed by a third portion of the first streaming video content, with the respective selected replacement content replacing a second portion of the first streaming video content. Replacement of the second portion of the first streaming video content may sometimes introduce latency, which may be reduced using various techniques.

19 Claims, 11 Drawing Sheets

(56) References Cited

U.S. PATENT DOCUMENTS

| | | | |
|---|---|---|---|
| 8,190,760 B2 | 5/2012 | Hurst et al. | |
| 8,321,905 B1 | 11/2012 | Streeter et al. | |
| 8,750,316 B2 | 6/2014 | Conway | |
| 10,028,008 B2 | 7/2018 | Lewis et al. | |
| 10,129,310 B1 | 11/2018 | Brunning et al. | |
| 2007/0191092 A1 | 8/2007 | Walker et al. | |
| 2008/0007651 A1 | 1/2008 | Bennett | |
| 2008/0018785 A1 | 1/2008 | Bennett | |
| 2008/0228912 A1* | 9/2008 | Vedantham | H04N 21/4384 709/224 |
| 2008/0242425 A1* | 10/2008 | Isaka | A63F 13/10 463/42 |
| 2010/0020811 A1 | 1/2010 | Candelore et al. | |
| 2010/0157013 A1 | 6/2010 | Sylvain et al. | |
| 2012/0236201 A1 | 9/2012 | Larsen et al. | |
| 2012/0236949 A1 | 9/2012 | Keating et al. | |
| 2013/0077940 A1 | 3/2013 | Shackleton et al. | |
| 2014/0137162 A1 | 5/2014 | McNamee et al. | |
| 2014/0150029 A1 | 5/2014 | Avedissian et al. | |
| 2014/0267578 A1* | 9/2014 | Rowe | H04N 7/15 348/14.11 |
| 2014/0368734 A1* | 12/2014 | Hoffert | H04N 5/44591 348/564 |
| 2015/0113407 A1* | 4/2015 | Hoffert | G06F 3/0482 715/720 |
| 2016/0049043 A1* | 2/2016 | Tennenhaus | G07F 17/326 463/25 |
| 2016/0360262 A1 | 12/2016 | Matejka et al. | |
| 2017/0169462 A1 | 6/2017 | Meredith et al. | |
| 2017/0171509 A1 | 6/2017 | Huang et al. | |
| 2018/0131741 A1* | 5/2018 | Song | H04N 21/23439 |
| 2018/0139512 A1* | 5/2018 | Moran | G06F 3/04883 |
| 2018/0204570 A1* | 7/2018 | Puranik | G10L 15/22 |

OTHER PUBLICATIONS

U.S. Appl. No. 15/472,665, filed Mar. 29, 2017, Hall et al.
"Video Measurement Across Devices"; mDialog.com; mDialog Corp.; May 17, 2014; 2 pages.
"1 to 1 Stream Addressability"; mDialog.com; mDialog Corp.; May 17, 2014; 2 pages.
"Reach and Monetize Audiences"; mDialog.com; mDialog Corp.; May 17, 2014; 2 pages.
"Orchestrate the Ad Break"; mDialog.com; mDialog Corp.; May 17, 2014; 2 pages.

* cited by examiner

SESSION-SPECIFIC STREAMING CONTENT REPLACEMENT

BACKGROUND

The popularity of transmitting video content over computer networks, such as the Internet, has increased dramatically in recent years. In some examples, video content may be provided using streaming transmission techniques, in which portions of the video content may be played and displayed to a viewer while subsequent portions of the same video content are still being transmitted. In some cases, in a technique commonly referred to as live streaming, video of an event (e.g., a video game, sports event, news event, etc.) may be transmitted and played as the event occurs with only small amounts of latency relative to its capture, such that at least a portion of the video content is played prior to completion of the event. In some examples, in combination with certain live or other streamed content, it may be desirable to provide certain additional content, such as advertising, notifications, and other additional content.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
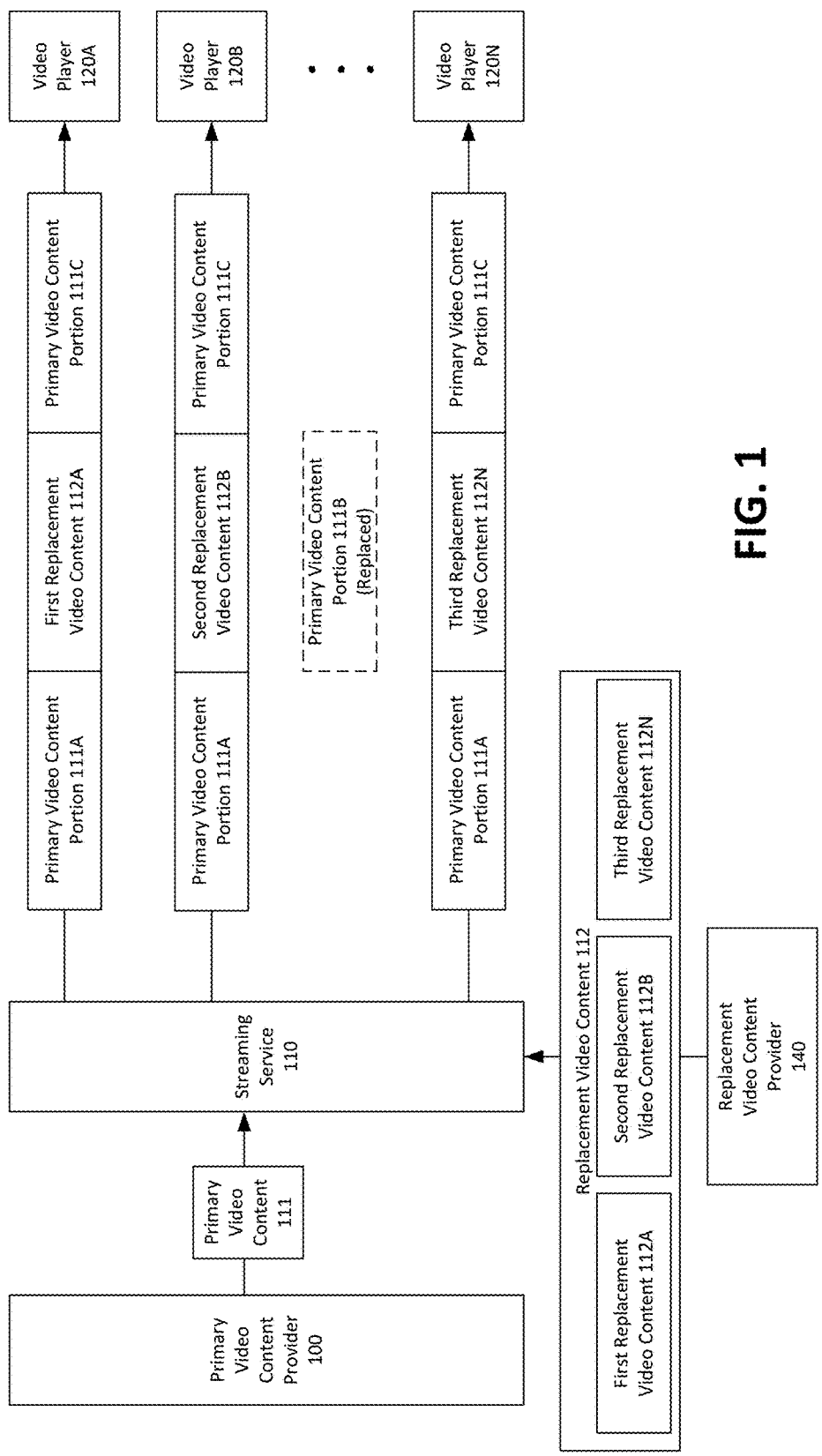
FIG. 1 is a diagram illustrating an example session-specific streaming content replacement system that may be used in accordance with the present disclosure.

Techniques for session-specific streaming content replacement are described herein. In some examples, primary video content may be transmitted, using streaming transmission techniques, from a streaming service to a plurality of different video players that may play the primary video content for a plurality of different respective viewers. In some cases, the primary video content may correspond to an event, such as a video game, sporting event, news event, or other event. In some examples, live streaming techniques may be employed, in which video of an event is transmitted and played as the event occurs with only small amounts of latency relative to its capture, such that at least a portion of the video content is played prior to completion of the event. In one specific example, video game content may be captured by a provider and live streamed to the streaming service, which may, in-turn, live stream the video content to a plurality of viewers. Also, in one specific example, the streaming service may be a video game streaming service to which the viewers subscribe.

In some examples, a provider that provides the primary video content to the streaming service may request that a particular portion of the primary video content be replaced by other replacement content, such as advertisements, notifications, and other replacement content. In some cases, as an incentive to request such replacement, the provider may be compensated, for example by the streaming service, for requesting (or otherwise allowing) portions of the primary video content to be replaced by advertising or other replacement content. In some examples, the request may be issued by the provider as the video content is being captured and provided to the streaming service and may indicate a desired duration for the replacement. As a result of the request, the primary video content that is transmitted by the streaming service, to the viewers, may be interrupted upon reaching the start of the portion indicated by the request. This indicated portion of the primary content may not be transmitted to the viewers and may instead be replaced with advertising or other replacement content that is transmitted and played to the viewers. Upon completion of playing of the replacement content, the streaming service may then switch back and return to transmitting a subsequent portion of the primary content.

In some examples, at least partially different replacement content may be provided to various different video players. For example, in some cases, the replacement content may be session-specific content, such as may be targeted to different characteristics of the different video players. These different characteristics may include, for example, a version of the video player, a platform on which the video player executes, hardware and/or software characteristics associated with the video player, a region or other location associated with the video player, characteristics of an associated viewer (e.g., viewer identifier, viewer age, viewer gender, viewer profile, viewer preferences, language information, etc.), and other characteristics. Additionally, in some examples, the replacement content may also be selected based on characteristics of the primary video content, such as a name or other identifiers of the content provider and/or channel on which the content is provided, a name, identifier and/or type of content being provided (e.g., game, sporting event, news event, entertainment event, etc.), targeted age and/or maturity rating, violence rating, language, and other characteristics.

The primary content that is transmitted to viewers may be encoded by a transcoder that repeatedly generates master playlists for different portions of the primary content. Each master playlist may be provided to a playlist service, which uses the master playlist to generate a variant (e.g., session-specific) playlist for transmission to each viewer's video player. In some examples, when the primary content is not being replaced, the variant playlists may be similar or identical to the master playlist. However, when a portion of the primary content is being replaced, the variant playlists may differ both from the master playlist and potentially from one another. In particular, when a provider requests replacement of a portion of primary content, a master playlist that includes that portion may indicate one or more segments of the primary video content for replacement. In some examples, when the playlist service receives this master playlist, the playlist service may request replacement content for each video player that is viewing the primary content. Specifically, in some examples, for a particular video player, the playlist service may issue a replacement content request for that video player. In some examples, the replacement content request may include parameters such as the video player characteristics for that video player, the primary video content characteristics, a requested duration for the replacement content, and other parameters. An indication of selected replacement content for the particular video player may then be returned to the playlist service, which may then generate a variant playlist for the particular video player in which the indicated segments of the primary video content are replaced by the selected replacement content. In some examples, multiple instances of this process may be performed, such as wholly or partially in parallel, for each video player that receives the primary content.

The primary video content and the replacement video content may each be divided into a number of segments. In some cases, however, the segment duration of the replacement video content that is selected for a particular video player may be different from the segment duration of the primary video content. For example, in some cases, the segment duration of the replacement video content may be four seconds, while the segment duration of the primary video content may be three seconds. In these scenarios, it may sometimes not be possible to exactly match a duration of the primary video content that is indicated for replacement with a duration of the selected replacement content. For example, two segments of primary video content having three second segment durations may be indicated for replacement, which may result in a six second total duration. However, if the selected replacement content has four second segment durations, then the duration of the replacement content may either be four seconds (if one replacement segment is used) or eight seconds (if two replacement segments are used). Thus, the duration of the replacement content will either be two seconds greater than, or two second less than, the duration of the replaced primary content.

In some examples, when the duration of the replacement content and the duration of the replaced primary content cannot be exactly matched, the duration of the replacement content may be selected such that it exceeds the duration of the replaced primary content by no more than the segment duration of the primary content. In particular, for the example described above, two segments of the replacement content (for a total of eight seconds) may be used to replace the two segments of primary content (for a total of six seconds). This may result in the replacement content exceeding the replaced primary content by two seconds, which is less than the three second segment duration of the primary content. In some cases, this approach may be desirable, for example because it may limit the amount of latency that is introduced into a session as a result of the replacement content to no more than the segment size of the primary content. In some examples, for live streaming, it may be particularly advantageous to limit the amount of latency introduced by replacement content, for example such that the primary content may continue to be viewed in close time proximity to being captured from a live event.

Moreover, in some examples, various approaches may be employed to reduce or eliminate the latency introduced by the excess duration of the replacement content. For example, in some cases, when subsequent replacements are performed for subsequent portions of the replacement content, the subsequent replacement content may again be selected to exceed the duration of the subsequent replaced primary content by no more than the segment duration of the primary content. After multiple replacements, the combined excess durations of the replacement content for the multiple replacements may eventually meet or exceed the segment duration of the primary content. When this happens, a segment of the primary content may be dropped in order to reduce or eliminate the latency introduced by the replacements. As another example, in some cases, frames of the primary video content may be dropped and/or played at a faster rate in order to reduce latency. As yet another example, in some cases, latency may be reduced by adjusting the timestamps of frames of the primary content. In particular, in some examples, these adjustments may be applied to one or more frames of the primary content having timestamps preceding a transition point at which the player switches from the replacement content back to the primary content. Specifically, the timestamps of these frames may be set to the timestamp of the frame immediately following the transition point, causing those frames to be decoded quickly (e.g., at faster than real-time) and not displayed, while allowing display of the primary content to resume at the subsequent frame with reduced latency.

FIG. 1 is a diagram illustrating an example session-specific streaming content replacement system that may be used in accordance with the present disclosure. As shown in FIG. 1, a primary video content provider 100 provides primary video content 111 to a streaming service 110. At least part of the primary video content 111 (e.g., primary video content portions 111A and 111C described below) may then transmitted by streaming service 110 to a number of video players 120A-N. The primary video content 111 may be transmitted from provider 100 to streaming service 110, and from streaming service 110 to video players 120A-N, over one or more communications networks, for example including one or more local area networks (LANs) and/or one or more wide area networks (WANs) such as the Internet. Additionally, the primary video content 111 may be transmitted from provider 100 to streaming service 110, and from streaming service 110 to video players 120A-N, using streaming transmission techniques, in which portions of video content may be played and displayed to a viewer while subsequent portions of the video content are still being transmitted. In some examples, the primary video content 111 may correspond to an event, such as a video game, sporting event, news event, or other live event. In some examples, live streaming techniques may be employed, in which the primary video content 111 is transmitted and played as the event occurs with only small amounts of latency relative to its capture, such that at least a portion of the video content is played prior to completion of the event. In one specific example, video game content may be captured by provider 100, for example using screen capture components, and live streamed to the streaming service 110, which may, in-turn, live stream the video content to video players 120A-N. Also, in one specific example, the streaming service 110 may be a video game streaming service to which viewers operating video players 120A-N may subscribe.

As will be set forth in detail below, the techniques disclosed herein may allow a portion of primary video content 111 to be replaced with replacement video content 112, such as advertisements, notifications, and other types of replacement content. In some examples, replacement video content 112 may be provided by at least one replacement video content provider 140, such as an advertising service or other replacement content provider. In the example of FIG. 1, replacement video content 112 includes first replacement video content 112A, second replacement video content 112B, third replacement video content 112N. As shown in FIG. 1, portion 111B of primary video content 111 may be replaced with replacement video content 112 (as indicated by the dashed lines surrounding portion 111B). In some examples, at least partially different replacement video content may be provided to various different video players 120A-N. In particular, in the example of FIG. 1, first replacement video content 112A is transmitted to video player 120A, second replacement video content 112B is transmitted to video player 120B, and third replacement video content 112N is transmitted to video player 120N. Thus, in the example of FIG. 1, video player 120A may play primary video content portion 111A, followed by first replacement video content 112A, followed by primary video content portion 111C. Video player 120B may play primary video content portion 111A, followed by second replacement video content 112B, followed by primary video content portion 111C. Video player 120N may play primary video content portion 111A, followed by third replacement video content 112N, followed by primary video content portion 111C. In one specific example, first replacement video content 112A may include a car advertisement, second replacement video content 112B may include a restaurant advertisement, and third replacement video content 112N may include an airline advertisement. In some examples, however, replacement video content 112A-C may merely be partially different from one another, such as different versions or styles of the same content. For example, replacement video content 112A-C may be advertisements for the same product with only minor differences, such as to target the product to different geographic regions, age groups, maturity levels, violence levels, income levels, etc. Moreover, it is noted that there is no requirement that all video players 120A-N must receive different replacement content and that two or more (or in some cases all) of the video players 120A-N may receive the same replacement content.

Figure 2:
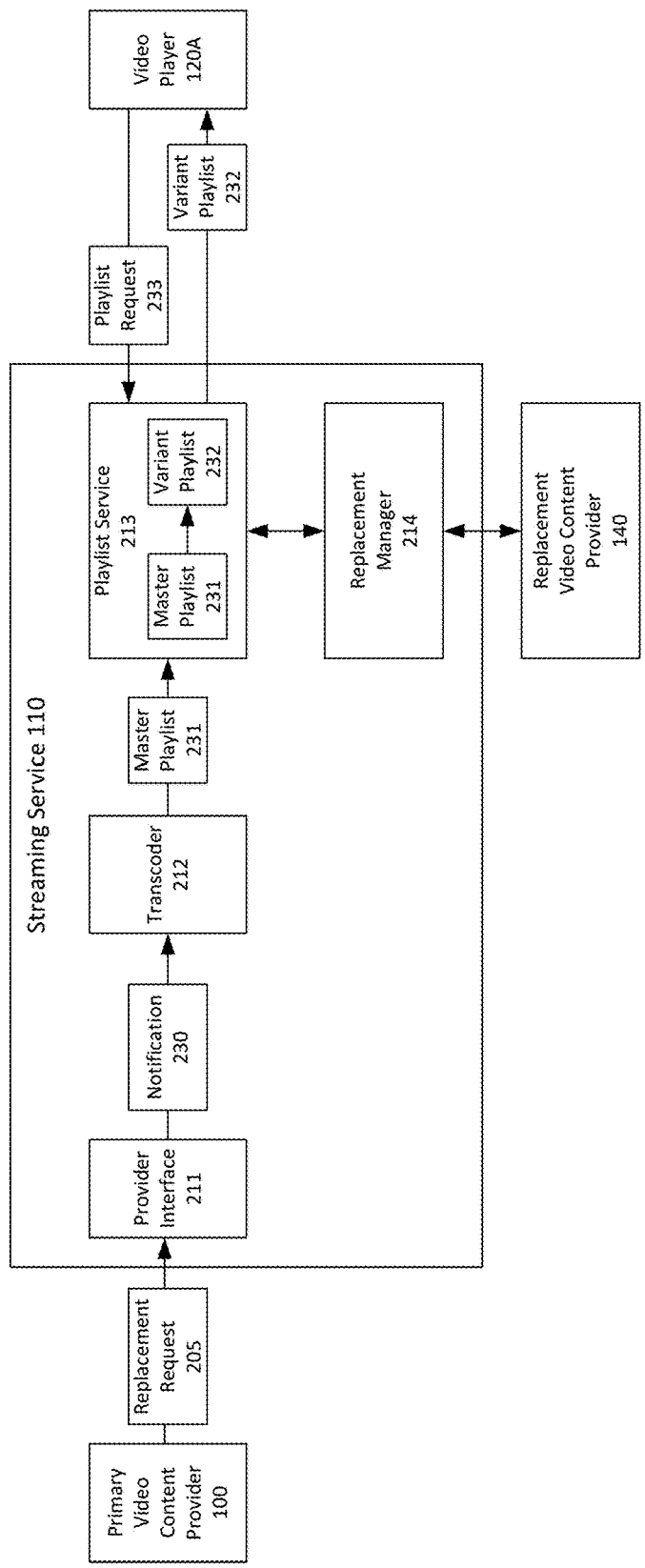
FIG. 2 is diagram illustrating an example session-specific playlist generation system that may be used in accordance with the present disclosure.

Referring now to FIG. 2, an example session-specific playlist generation system will now be described in detail. In the example of FIG. 2, primary video content provider 100 may issue a replacement request 205 to replace a portion 111B of the primary video content 111. In some cases, as an incentive to request such replacement, provider 100 may be compensated, for example by the streaming service 110, for requesting (or otherwise allowing) portions of the primary video content 111 to be replaced by advertising or other replacement video content 112. In some examples, the request 205 may be issued by the provider 100 as the primary video content 111 is being captured and provided to the streaming service 110. The request 205 may be received by provider interface 211, such as a web interface, an application programming interface (API), and/or any combinations of one or more other types of computing interfaces. In some examples, the request 205 may include information such as a desired duration for the replacement, a desired time (e.g., time of day, elapsed transmission time, etc.) for the replacement to start and/or end, and other information. In some examples, the request 205 need not necessarily indicate a desired replacement start or end time, and the replacement may instead start upon receiving and processing of the request 205, thereby allowing the provider 100 to live-request (e.g., in real-time or near-real-time) the replacement of the primary video content 111. In some examples, the provider 100 may be limited to issuing a certain quantity and/or frequency of valid replacement requests, and the provider interface 211 may confirm that the request 205 does not violate any of these or other replacement limits associated with the provider 100.

Upon receiving the replacement request 205, the provider interface 211 may generate a notification 230. In some examples, the notification 230 may include the replacement duration (and/or other request parameters) as well as an indication of one or more characteristics of the primary video content 111, such as a name or other identifiers of the provider 100 and/or channel on which the primary video content 111 is provided, a name, identifier and/or type of content being provided (e.g., game, sporting event, news event, entertainment event, etc.), targeted age and/or maturity rating, violence rating, language, and other characteristics. In some examples, the provider interface 211 may obtain these characteristics based on information received from the provider 100 and/or otherwise determined by streaming service 110. The notification 230 may then be provided to a transcoder 212, which transcodes the primary video content 111 for delivery to video players 120A-N.

Transcoder 212 may periodically generate a master playlist 231 for a respective window of time during the transmission of the primary video content 111. Each master playlist 231 may be provided to a playlist service 213, which uses the master playlist 231 to generate variant (e.g., session-specific) playlists for transmission to each viewer's video player. In some examples, for windows of time in which the primary video content 111 is not being replaced, the variant playlists may be similar or identical to the master playlist 231. However, for windows of time in which a portion of the primary video content 111 is being replaced, the variant playlists may differ both from the master playlist and potentially from one another. In the example of FIG. 1, a variant playlist 232 is shown for transmission to a particular video player 120A.

Video player 120A may periodically issue a playlist request 233 to playlist service 213 to request a variant playlist 232 for a respective window of time during the transmission of the primary video content 111. In some examples, the playlist request 233 may include or otherwise indicate one or more characteristics of the video player 120A. These characteristics may include, for example, a version of the video player 120A, a platform on which the video player 120A executes, hardware and/or software characteristics associated with the video player 120A, a region or other location associated with the video player 120A, characteristics of an associated viewer (e.g., viewer identifier, viewer age, viewer gender, viewer profile, viewer preferences, language information, etc.), and other characteristics. In some examples, when the video player 120A initiates a communications session to receive the primary video content 111, the video player 120A may provide an indication of its video player characteristics and request a token, for example from streaming service 110, for issuing the playlist request 233. This token may then be submitted with each playlist request 233 issued by the video player 120A for the primary video content 111.

When the provider 100 requests replacement of a portion of the primary video content 111, the master playlist 231 that includes that portion may indicate one or more segments of the primary video content 111 for replacement. In some examples, the master playlist may include an indication of one or more primary video content characteristics, such as those described above, as well as an indication of the duration of the replacement. In some examples, when the playlist service 213 receives this master playlist 231, the playlist service 213 may request replacement video content for each video player that is viewing the primary content. In some examples, the replacement content request may include parameters such as the video player characteristics for that video player, the primary video content characteristics, a requested duration for the replacement content, and other parameters. For example, for video player 120A, the playlist service 213 may issue a replacement content request that includes video player characteristics specific to video player 120A as well as the other parameters described above.

In some examples, the replacement content request issued by the playlist service may be provided to replacement manager 214, which may use the parameters indicated in the request to generate a request to replacement video content provider 140 to provide an indication of replacement content for use in the variant manifest for the particular video player 120A. For example, the replacement video content provider 140 may select, based at least in part on the video player characteristics specific to video player 120A as well as the primary video content characteristics, replacement content for video player 120A. Replacement video content provider 140 may return an indication of the selected replacement video content to replacement manager 214. It is noted that, in some examples, there may be multiple replacement video content providers 140. For example, in some cases, a provider that selects replacement video content as described above may be at least partially different from a service that provides the replacement video content to the streaming service 110. The replacement manager 214 may then provide information regarding the selected replacement content back to playlist service 213 for inclusion in the variant playlist 232. In some examples, the information returned by replacement manager 214 may include a link or other indication of a location in which the selected replacement content is stored or is otherwise accessible.

Figure 3:
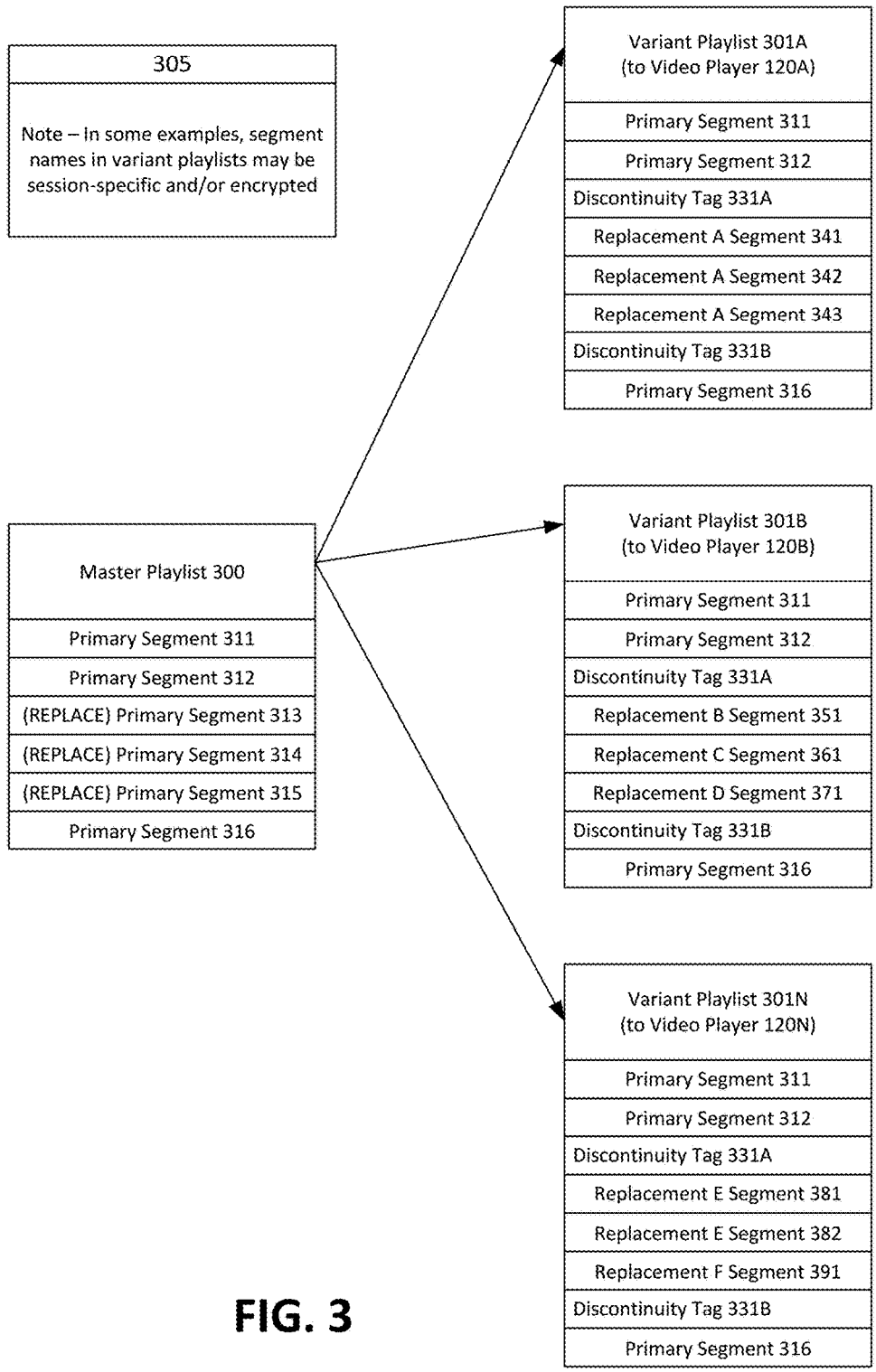
FIG. 3 is diagram illustrating example master and variant playlists that may be used in accordance with the present disclosure.

Referring now to FIG. 3, an example of master and variant playlists will now be described in detail. In particular, as shown in FIG. 3, a master playlist 300 may be generated by a transcoder 212 that encodes the primary video content 111. In the example of FIG. 3, master playlist 300 includes instructions for a particular window of time corresponding to primary segments 311-316 of primary video content 111. As shown, the master playlist 300 includes instructions to replace primary segments 313-315 (as indicated by the word REPLACE that is included within those segments). As should be appreciated, there is no requirement that a master playlist must use the word REPLACE to indicate segments for replacement, and any combination of different techniques may be employed to indicate this. For example, in some cases, to indicate a replacement, transcoder 212 may insert into the master playlist 300 information that indicates a duration of the replacement as well as characteristics of the primary video content 111 such as those described above.

In the example of FIG. 3, playlist service 213 generates, based on master playlist 300, three variant playlists 301A-N, which are provided to video players 120A-N, respectively. Each of variant playlists 301A-N includes a discontinuity tag 331A to indicate a transition from the primary video content 111 to the respective selected replacement video content. Additionally, each of variant playlists 301A-N includes another discontinuity tag 331B to indicate a transition from the respective selected replacement video content back to the primary video content 111. As shown, for variant playlist 301A, primary segments 313-315 are replaced by three segments 341-343 of Replacement A. For variant playlist 301B, primary segments 313-315 are replaced by a segment 351 of Replacement B, followed by a segment 361 of Replacement C, followed by a segment 371 of Replacement D. For variant playlist 301N, primary segments 313-315 are replaced by two segments 381-382 of Replacement E followed by a segment 391 of Replacement F.

In some cases, certain viewers could potentially use the variant playlists 301A-N to attempt to identify advertising or other replacement content and avoid playing of such content. In particular, in some cases, viewers may attempt to identify segment names within the variant playlists that are different from the segment names of the primary video content 111 and/or that correspond to known advertising or other replacement content. For these and other reasons, as indicated in note 305, in some examples, segment and/or playlist names in master and variant playlists may be session-specific, encrypted and/or otherwise modified such as to increase the difficulty of being identifiable. Specifically, the use of session-specific segment and/or playlist names may increase the difficulty of identifying replacement content across different viewer sessions. For example, even if a particular viewer were to identify replacement content segment names for a particular session, the use of session-specific names would still prevent (or substantially reduce the risk of) those segments being identifiable in other viewer sessions. Moreover, the use of encrypted (or otherwise modified) segment and/or playlist names may prevent (or substantially reduce the risk of) those segment names being identifiable within the variant playlists 301A-N. In some examples, symmetric encryption may be employed for encrypting of segment and/or playlist names, whereby only entities in possession of a secret key may access the encrypted data. In particular, in some cases, a secret key may be distributed across various components of a streaming service in a secure manner to allow those components to access the encrypted data. This may assist in allowing communication channels between components of the streaming service to be kept secure from inspection of external users.

In some examples, a symmetric cipher may be employed that allows encrypted data to be authorized before decryption, such as Galois/Counter Mode of Advanced Encryption Standard (GCM-AES) cipher. This property may make it computationally infeasible for external parties to spoof or modify uniform resource locators (URLs) or other locators in the data and remove any necessity for data integrity checks that may be needed after decryption of the data. Additionally, in some examples, a binary data format with a well-defined schema may be employed for the data, such as a format with readily available bindings for different programming languages, a strict schema for stored data, and the ability to easily modify existing definitions in a backwards-compatible manner. Furthermore, in some cases, a common repository of data definitions may be created to assist in allowing interoperability between components of the streaming service.

In one specific example, the overall format of URLs used to access segments and playlists may fit the following schema:

/v1/playlist/<payload>.m3u8
/v1/segment/<payload>.ts

In one example, the <payload> may a base64 representation of an encrypted binary format. The prefix of the URL may include version information that, for example, may allow changes to be introduced that cannot be expressed by modification of the data definition. The middle part may include a redundant marker of the type of the request (e.g., playlist or segment) and may be provided as information for the playlist service for routing of different types of requests to different components. In some examples, the indicated value (e.g., playlist or segment) in the middle part of the schema may be required to match the indicator stored in the encrypted payload, and non-matching requests may be rejected. As an example, the URL may look as follows:

/v1/segment/CtUB5rt0gvmes30F-
l9itS7idJo4GnoZcp_VvDLXZNjtCJ6CM24NSo7_-
hB0DFo5pEmVCwIXU_t2rwzMjZilG8a5M1i5Dtu2M11
yt_GsYmQoUt1LAiNrG4FFJ9Vda
9Dr87r2WmNxIXFQ0lbfIZKvFei9ZunM6Gpw7KxWXB
B8bdFt7abNSKG71H6TNfc62MlH
VYpfXkZ1OqdbaKtPLvuskqEEGjnfESQF61ArvQiLhFj8
jRnUHlNzBG2dsHepW3PczSp_6g
vs5Gh9TMtbNcpgX1voN3QK62EhCLSZsJoBjq3Ze2Gd
0gnCTVGgzoyaf4XtS80Q8lkqA In some examples, the actual data stored in the URL may not be accessed without access to a secret symmetric key.

The payload of the URL may be a base64 encoded binary structure. Base64 is a textual representation of arbitrary binary data that can be safely used as part of an Internet URL. Once the conversion from the URL's text to binary string of data is done, the first level of un-marshalling may be performed to extract elements of the ciphertext as produced by the cipher. One specific example of this information is shown below:

version: GCM/AES
    signature: <binary authorization data>
    ciphertext: <binary encrypted data>
    iv: <binary initialization vector data>

The highlighted version field indicates that GCM/AES is used and may allow for future changes of the used cipher. The other three components are specific to GCM/AES and, once combined with the secret symmetric key, can be used to extract the actual decrypted payload. Given that there may be more than one component of the streaming service that may have an interest in accessing the contents of the encrypted URL, a breadth of information may be stored in the payload. The data may be structured using sub-messages, a way to compose simpler data structures into more complex ones.

In some cases, an encrypted segment name may include encrypted data that represents characteristics of a request for an associated segment, characteristics of an associated session, characteristics of an associated stream, and/or a uniform resource identifier (URI) or other identifier for the associated segment. As an example, the URL presented earlier may represent the following data about a segment request:

request {
    protocol: HTTP
    playlist_node: "video-edge-2ca3c4.sfo01"
    expiration {
       seconds: 1472154874
    }
    }
    session {
    id: 2610529275472644968
    ppid: "12345678"
    authenticated: true
    stitching_ads: true
    }
    stream {
    broadcast_id: "22994026464"
    channel: "food"
    quality: "mobile"
    origin_resource_path:       "/hls-833f38/
       food_22994026464_506008463"
    }
    segment {
    uri: "hls-833f38/food_22994026464_506008463/mobile/
       index-0000010257-sED9.ts"
    }

In one example, the above data may be for a URL allowing a download of one segment of primary video content from the specified "Video Edge" server (e.g., playlist service) for channel "food". While the above data is for primary video content, replacement video content may also be indicated using the above-described techniques. For example, in some cases, for replacement content, the broadcast_id (or other data) shown in the above example may be changed to a designated value such as "12345678".

As set forth above, in some examples, replacement video content may be provided to streaming service 110 by at least one replacement video content provider 140, such as an advertising service or other replacement content provider. In some examples, upon receiving replacement video content from a provider 140, the streaming service 110 may transcode the replacement video content into a number of renditions having different image qualities with respect to one another. For example, these different renditions may have different encoding bitrates, resolutions, and/or other different image quality characteristics with respect to one another. In some examples, the video players 120A-N that receive video content from the streaming service 110 may have different respective network conditions (e.g., network bandwidth, congestion, etc.) and computing characteristics (e.g., processor capacity, memory capacity, etc.) that may determine which image quality rendition is suited for each individual video player 120A-N. Transcoding the replacement video content into different image quality renditions may allow different video players to receive different image quality renditions of the replacement content that are suited for their specific conditions. Moreover, transcoding and storing the replacement video content in different image quality renditions in advance of its transmission to the video players 120A-N may allow the different image quality renditions to be available and fetched on-demand upon being selected for replacement, thereby improving efficiency. In some cases, replacing of primary video content with replacement video content that has a substantially lower (or otherwise different) image quality than the primary video content may cause a poor and inconsistent viewing experience for the viewer. By contrast, transcoding and storing the replacement video content in different image quality renditions may allow, for a particular video player 120A-N, replacement video content having the same (or similar) image quality as the primary video content to be fetched and transmitted, thereby providing a more consistent and improved viewer experience.

Figure 4:
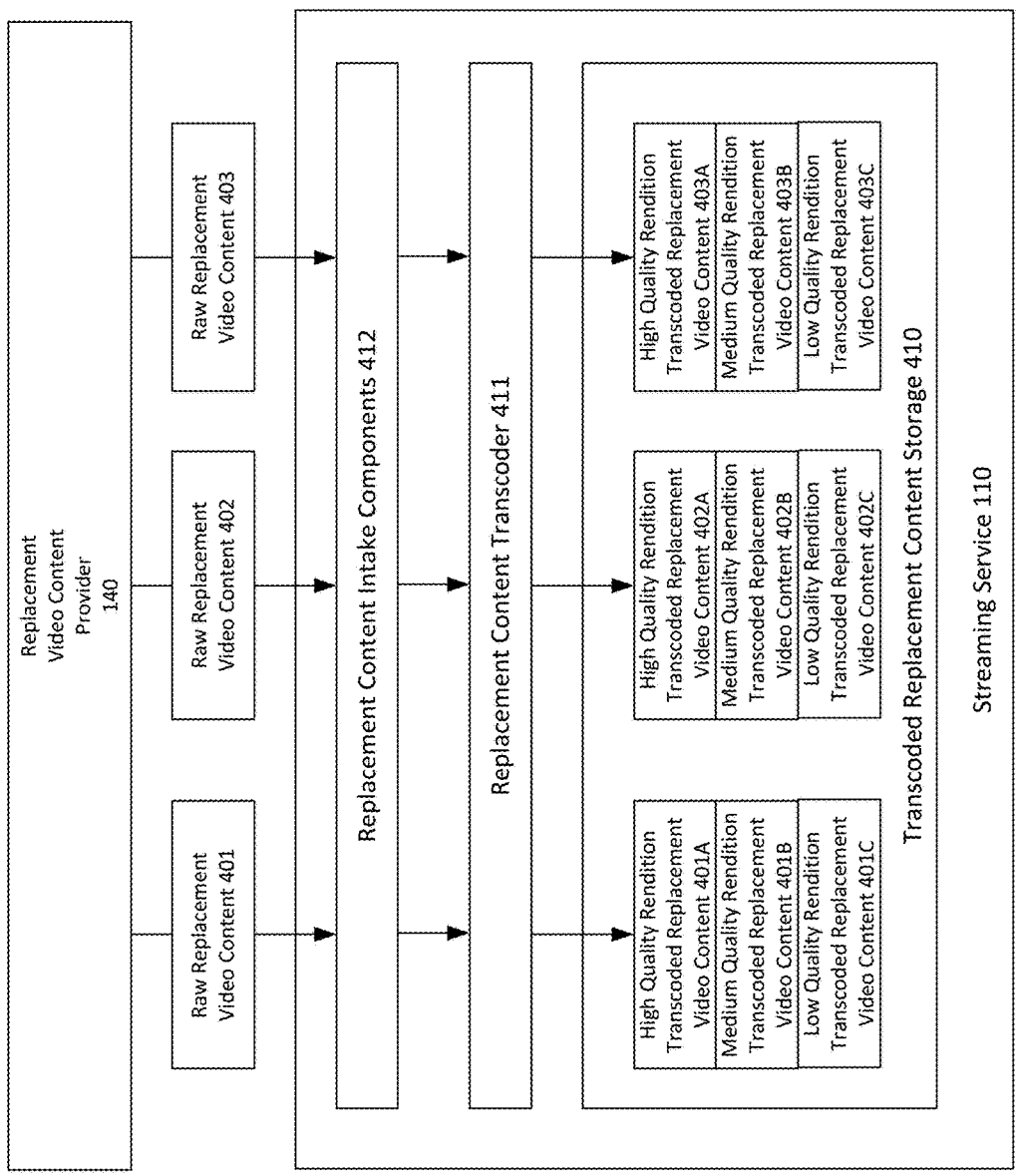
FIG. 4 is a diagram illustrating example intake, transcoding and storage of replacement video content that may be used in accordance with the present disclosure.

Referring now to FIG. 4, an example of intake, transcoding and storage of replacement video content will now be described in detail. In particular, as shown in FIG. 4, three sets of raw replacement video content 401-403 may be provided by replacement video content provider 140 to streaming service 110. In particular, the raw replacement video content 401-403 may be received by replacement content intake components 412, which may store the raw replacement video content 401-403 and queue or otherwise notify the replacement content transcoder 411 that the raw replacement video content 401-403 is available for transcoding. As shown, raw replacement video content 401 is transcoded by the transcoder 411 into three renditions: a high quality rendition 401A, a medium quality rendition 401B, and a low quality rendition 401C. For example, in some cases, high quality rendition 401A may have a higher encoding bitrate and/or resolution, medium quality rendition 401B may have a medium encoding bitrate and/or resolution, and a low quality rendition 401C may have a lower encoding bitrate and/or resolution. As also shown, raw replacement video content 402 is transcoded into high, medium, and low quality renditions 402A-C, and raw replacement video content 403 is transcoded into high, medium, and low quality renditions 403A-C. The renditions 401A-C, 402A-C, and 403A-C are then stored in transcoded replacement content storage 410 such that they may be fetched and played on demand by video players 120A-N. It is noted that the high, medium, and low quality renditions shown in FIG. 4 are merely examples and that there is no requirement that replacement video content must have high, medium, low or any particular quantities or types of different renditions.

Figure 5:
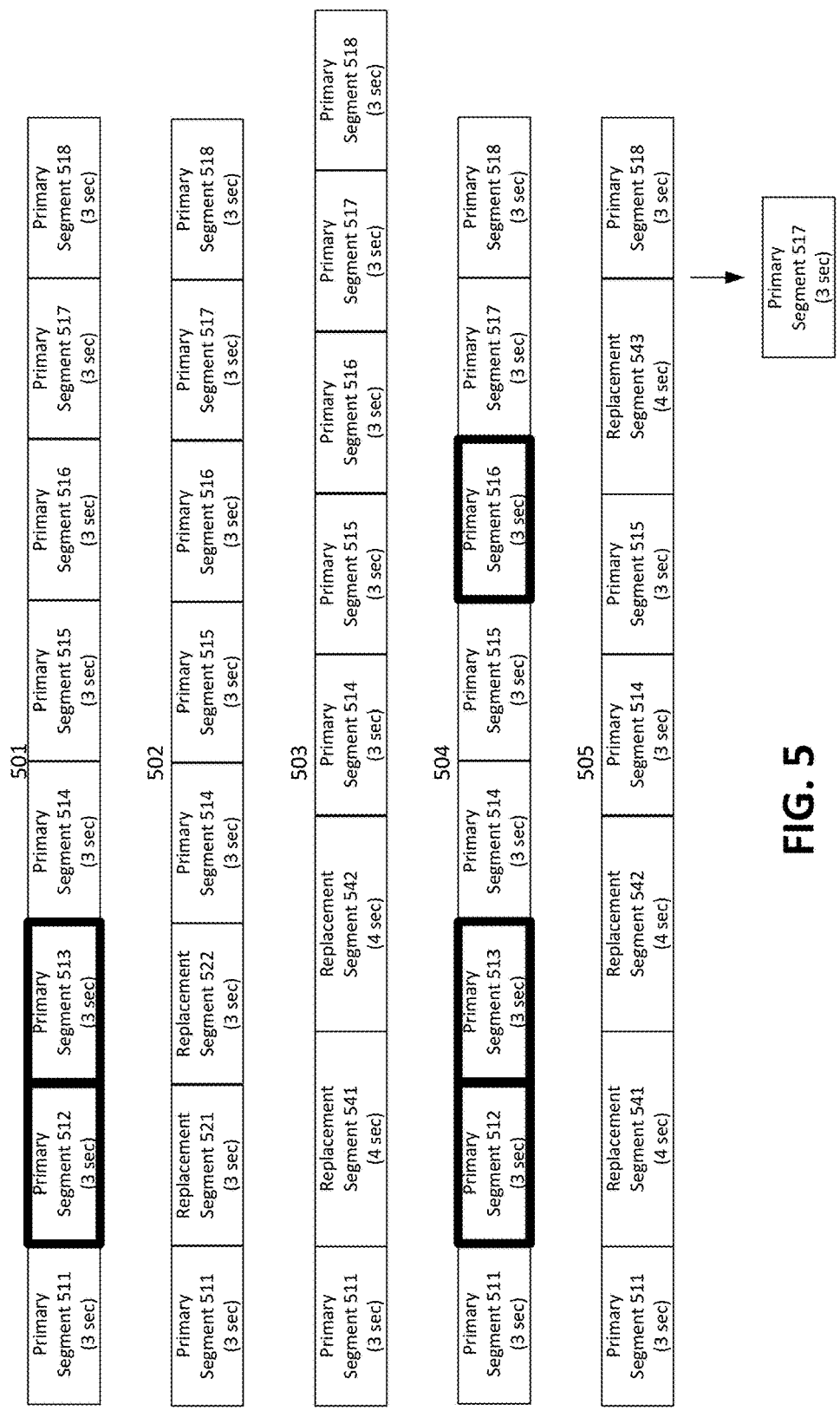
FIG. 5 is a diagram of primary video segments and replacement video segments that may be used in accordance with the present disclosure.

As set forth above, the primary video content and the replacement video content may each be divided into a number of segments. In some cases, however, the segment duration of the replacement video content that is selected for a particular video player may be different from the segment duration of the primary video content. Referring now to FIG. 5, some examples of primary video segments and replacement video segments will now be described in detail. In particular, FIG. 5 includes a diagram 501 that shows a set of primary segments 511-518 of the primary video content. As shown, each of the primary segments 511-518 has a segment duration of three seconds. In diagram 501, a determination is made (e.g., in response to a replacement request from primary video content provider 100) to replace primary segments 512 and 513 (as indicated by the thick bold lines around segments 512 and 513).

FIG. 5 includes another diagram 502, which shows an example scenario in which the primary video content is replaced by replacement video content having the same segment duration (i.e., three seconds) as the primary video content. Specifically, diagram 502 shows that primary segments 512 and 513 are replaced by replacement segments 521 and 522. In diagram 502, because replacement segments 521 and 522 have the same segment duration (i.e., three seconds) as primary video content, there is no latency introduced by the replacement of primary segments 512 and 513. It is noted that, while no latency may be introduced as a result of the replacement of segments 512 and 513 in diagram 502, there may still be additional latency associated with playing of the primary video content, such as latency resulting from transmission of primary video content, latency resulting from buffering of the primary video content and/or other latency.

In contrast to diagram 502, FIG. 5 includes a third diagram 503, which shows an example scenario in which the primary video content is replaced by replacement video content having a different segment duration than the primary video content. Specifically, diagram 503 shows an example in which primary video content having a segment duration of three seconds is replaced by replacement video content having a segment duration of four seconds. In the example of diagram 503, it may not be possible to exactly match a total duration of the replaced primary segments 512 and 513 (i.e., six seconds) with a duration of the selected replacement content. In particular, the duration of the replacement content may either be four seconds (if one replacement segment is used) or eight seconds (if two replacement segments are used). Thus, the duration of the replacement content will either be two seconds greater than, or two second less than, the duration of the replaced primary content.

In some examples, when the duration of the replacement content and the duration of the replaced primary content cannot be exactly matched (such as in the case of diagram 503), the duration of the replacement content may be selected such that it exceeds the duration of the replaced primary content by no more than the segment duration of the primary content. In particular, as shown in diagram 503, two replacement segments 541 and 542 (having a total duration of eight seconds) may be used to replace primary segments 512 and 513 (having a total duration of six seconds). This may result in the replacement content exceeding the replaced primary content by two seconds, which is less than the three second segment duration of the primary content. In some cases, this approach may be desirable, for example because it may limit the amount of latency that is introduced into session as a result of the replacement content to no more than the segment size of the primary content. In some examples, for live streaming, it may be particularly advantageous to limit the amount of latency introduced by replacement content, for example such that the primary content may continue to be viewed in close time proximity to being captured from a live event. Once again, it is noted that there may be other latency associated with playing of the primary content due to other factors besides content replacement, such as latency due to transmission time, buffering, etc. The above discussion is not intended to imply that there must be no latency other than latency introduced by the replacement techniques described herein.

Additionally, in some examples, various approaches may be employed to reduce or eliminate the latency introduced by the excess duration of the replacement content. For example, when subsequent replacements are performed for subsequent portions of the replacement content, the subsequent replacement content may again be selected to exceed the duration of the subsequent replaced primary content by no more than the segment duration of the primary content. In some examples, playlist service 213 may keep track of the total latency introduced by the excess duration of each insertion of replacement content for a particular session, for example by maintaining a counter or other stored value that reflects this excess duration. After multiple replacements, the combined excess durations of the replacement content for the multiple replacements may eventually meet or exceed the segment duration of the primary content. When this happens, a segment of the primary content may be dropped in order to reduce or eliminate the latency introduced by the replacements.

Specifically, diagram 504, shows an example in which, in addition to replacing segments 512 and 513, a determination is also made (e.g., in response to a replacement request from primary video content provider 100) to replace primary segment 516 (as indicated by the thick bold lines around segment 516). Additionally, diagram 505 shows another example in which the replacement video content has a four second segment duration. In particular, in diagram 505, primary segments 512 and 513 are replaced by replacement segments 541 and 542 just as shown above in diagram 503. Additionally, in diagram 505, a determination is made to replace primary segment 516 with replacement segment 543. As shown, the substitution of replacement segment 543 for primary segment 516 introduces an additional second of latency. This causes the total latency introduced by the insertion of replacement segments 541, 542 and 543 to increase to three seconds, which is equivalent to the segment size of the primary content. Accordingly, in this example, upon determining that the total introduced latency has become equivalent to the segment size of the primary content, the playlist service 213 may determine to drop the next primary segment (e.g., primary segment 517), which is indicated by the downward arrow extending from diagram 505 to primary segment 517. As shown, upon dropping of primary segment 517, the latency introduced by the insertion of replacement segments 541, 542 and 543 is removed.

It is noted that the segment dropping techniques shown in diagram 505 are merely one example latency reduction technique and that other latency reduction techniques may also be employed. For example, in some cases, subsequent to a replacement that introduces latency, frames of the primary video content may be dropped and/or played at a faster rate in order to reduce latency. As yet another example, in some cases, latency may be reduced by adjusting the timestamps of frames of the primary content. In particular, in some examples, these adjustments may be applied to one or more frames of the primary content having timestamps preceding a transition point at which the player switches from the replacement content back to the primary content. Specifically, the timestamps of these frames may be set to the timestamp of the frame immediately following the transition point, causing those frames to be decoded quickly (e.g., at faster than real-time) and not displayed, while allowing display of the primary content to resume at the subsequent frame with reduced latency.

Figure 6:
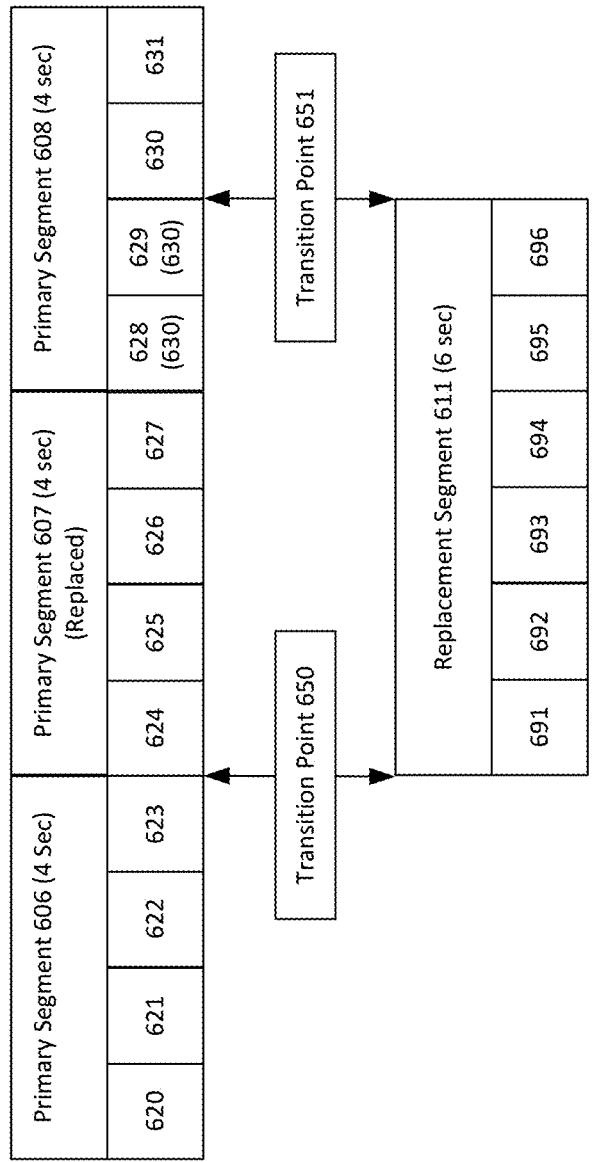
FIG. 6 is a diagram illustrating an example timestamp adjustment that may be used in accordance with the present disclosure.

Referring now to FIG. 6, an example timestamp adjustment will now be described in detail. In particular, as shown in FIG. 6, a portion of primary video content may include three primary segments 606, 607 and 608. Each of primary segments 606-608 has a segment duration of four seconds. Additionally, each of primary segments 606-608 includes four video frames. In particular, primary segment 606 includes frames with timestamp values 620-623, primary segment 607 includes frames with timestamp values 624-627, and primary segment 608 includes frames with timestamp values 628-631. A determination may be made to replace primary segment 607 (as indicated by the word "Replaced" shown in primary segment 607). As shown in FIG. 6, primary segment 607 is replaced by replacement segment 611, which has a segment duration of six seconds. Replacement segment 611 includes frames with timestamp values 691-696. At a transition point 650, which is at the end of primary segment 606, a respective video player may switch from the primary content to the replacement segment 611. Additionally, at a subsequent transition point 651, which is at the end of replacement segment 611, the respective video player may switch back from replacement segment 611 to the primary content. As should be appreciated, the substitution of replacement segment 611 for primary segment 607 results in an introduction of two seconds of latency into the playing of the primary content. In the example of FIG. 6, a determination is made by the respective video player to remove the two seconds of latency introduced by this replacement by adjusting the timestamp values 628 and 629 for the first two frames in segment 607. In particular, the timestamp values 628 and 629 are both changed to the timestamp value 630 of the frame immediately following the transition point 651. This is indicated in FIG. 6 by showing the adjusted-to timestamp value 630 in parentheses just below the adjusted-from timestamp values 628 and 629. This timestamp adjustment causes the two frames with adjusted timestamps to be decoded more quickly than the other primary content frames (e.g., at faster than real-time), which removes the latency introduced by the replacement of primary segment 607. Additionally, the two frames with adjusted timestamps are not displayed by the video player. The display of the primary content may resume at the subsequent frame immediately following the transition point 651.

Figure 7:
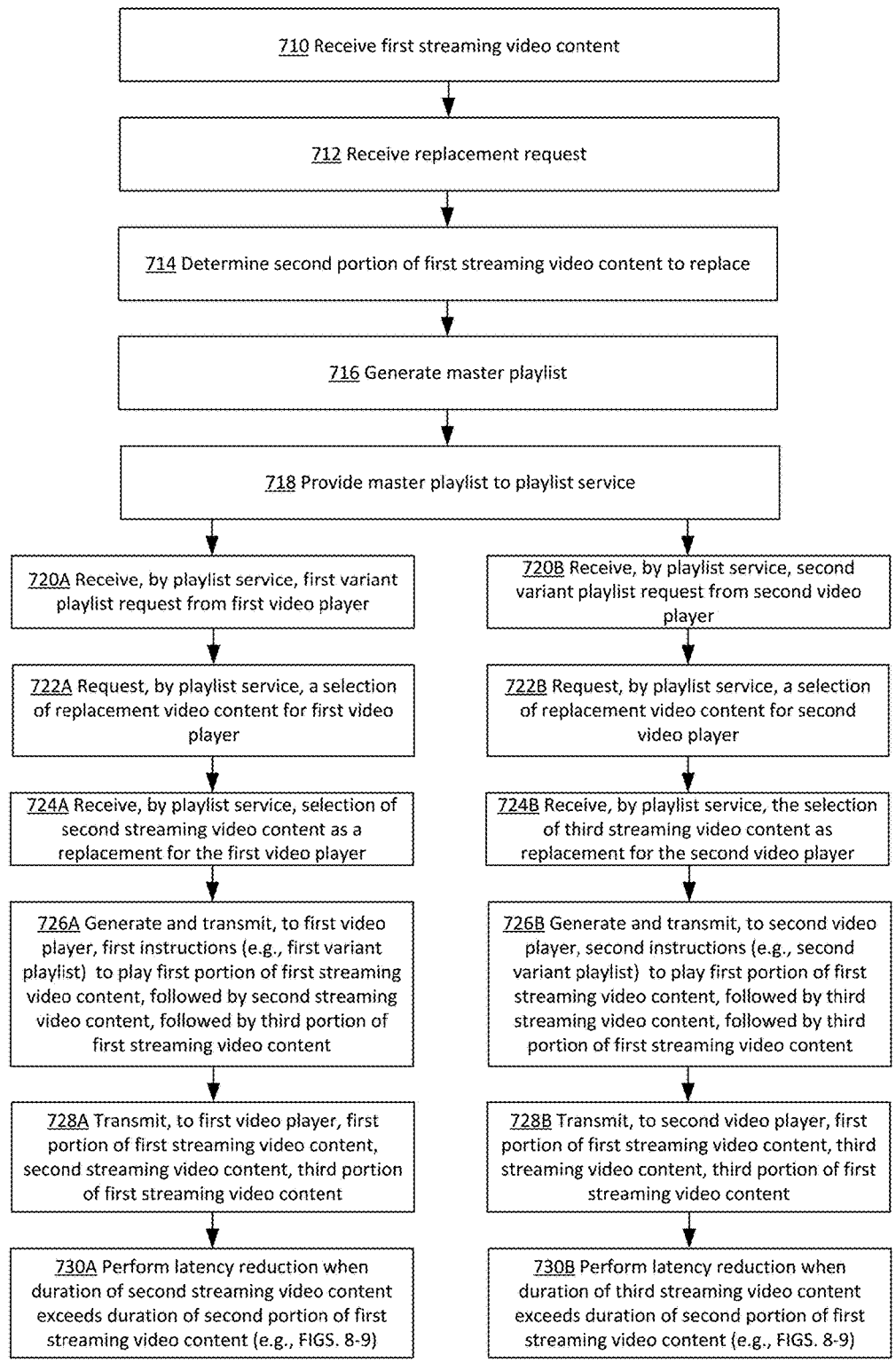
FIG. 7 is a flowchart illustrating an example session-specific streaming content replacement process that may be used in accordance with the present disclosure.

FIG. 7 is a flowchart illustrating an example session-specific streaming content replacement process that may be used in accordance with the present disclosure. As shown, the process of FIG. 7 may begin at operation 710, at which first streaming video content, such as primary video content 111 FIG. 1, is received. As set forth above, in some examples, the first streaming video content may be received by a streaming service from a provider, such as primary video content provider 100 of FIG. 1. The first streaming video content may be received for transmission to a plurality of video players, for example including a first video player and a second video player. In some examples, the first streaming video content may be live streaming video content. Live streaming video content may include video of an event (e.g., a video game, sports event, news event, etc.) that is transmitted and played as the event occurs with only small amounts of latency relative to its capture, such that at least a portion of the video content is played prior to completion of the event.

At operation 712, a replacement request is received for replacement of part of the first streaming video content with other video content. In some examples, the replacement request may be received from the provider of the first streaming video content. Also, in some examples, the replacement request may be received during the receiving of the first streaming video content at operation 710. In some examples, the replacement request may include information such as a desired duration for the replacement, a desired time (e.g., time of day, elapsed transmission time, etc.) for the replacement to start and/or end, and other information. In some examples, the replacement request need not necessarily indicate a desired replacement start or end time, and the replacement may instead start upon receiving and processing of the replacement request, thereby allowing the provider to live-request (e.g., in real-time or near-real-time) the replacement of the first streaming video content. In some examples, the first streaming video content provider may be limited to issuing a certain quantity and/or frequency of valid replacement requests, and, in order to proceed with processing of the replacement request, it may first be determined that the replacement request does not result in violation of the frequency and/or quantity.

At operation 714, a second portion of the first streaming video content (e.g., primary video content portion 111B of FIG. 1) is determined to replace with the other streaming video content. As set forth above, in some examples, the second portion may be determined based, at least in part, on a replacement duration that may be indicated in the replacement request. Additionally, in some examples, the second portion may be determined based, at least in part, on when the replacement request is received, such as a time at which the request is received by provider interface 211 and/or transcoder 212. For example, in some cases, the replacement may be initiated upon receiving and processing of the replacement request. Furthermore, in some examples, the second portion may be determined based, at least in part, on a start time and/or end time that may sometimes be indicated in the replacement request. Additionally, in some examples, operation 714 may include a two-stage process for determining the second portion of the first streaming video content to replace. For example, in a first stage, a transcoder (e.g., transcoder 212 of FIG. 2) may determine a preferred portion of the first streaming video content that is to be replaced, such as based on the duration and/or timing of the replacement request from the provider. Additionally, in a second stage, a playlist service (e.g., playlist service 213 of FIG. 2) may then adjust the preferred portion determined in the first stage, for example based on factors such as latency associated with selection of the replacement content (e.g., including delays in receiving an indication of that selection). For example, a long latency for replacement content selection may cause the playlist service to replace a subsequent portion of the first streaming video content that is received and transcoded subsequent to the preferred portion selected initially by the transcoder.

At operation 716, a master playlist is generated, for example by a transcoder that transcodes the first streaming video content. In some examples, the master playlist may indicate a first portion of the first streaming video content (e.g., primary video content portion 111A of FIG. 1), the second portion of the first streaming video content (e.g., primary video content portion 111B of FIG. 1), and a third portion of the first streaming video content (e.g., primary video content portion 111C of FIG. 1). Additionally, in some examples, the master playlist may indicate that the second portion of the first streaming video content is selected for replacement by other video content. Furthermore, in some examples, the master playlist may indicate one or more characteristics of the first streaming video content, such as one or more characteristics of the provider of the first streaming video content, a channel on which the first streaming video content is provided, a name, identifier and/or type of content being provided (e.g., game, sporting event, news event, entertainment event, etc.), targeted age and/or maturity rating, violence rating, language, and/or other characteristics. At operation 718, the master playlist is provided to a playlist service, such as playlist service 213 of FIG. 2.

At operation 720A, the playlist service receives a first variant playlist request from the first video player. In some examples, operation 720A may include receiving an indication of one or more characteristics associated with the first video player, which may be included in (or otherwise indicated by) the first variant playlist request. In some examples, the one or more characteristics associated with the first video player may include a version of the first video player, characteristics of a computer system (e.g., platform, hardware, software, region, location, etc.) on which the first video player executes, characteristics of a viewer (e.g., age, gender, location, profile, preferences, etc.) that operates the first video player and/or other characteristics.

At operation 722A, the playlist service requests a selection of replacement video content for the first player. For example, the playlist service may issue a request, based at least in part on the master playlist, for the selection that includes one or more characteristics of the first streaming video content, one or more characteristics of the first video player, a duration of the replacement and/or other information. At operation 724A, the playlist service receives a selection of second streaming video content as a replacement for the first video player. In some examples, the second streaming video content may be selected as a replacement based, at least in part, on one or more characteristics of the first streaming video content, one or more characteristics of the first video player, a duration of the replacement and/or other information. In some examples, the second streaming video content may include one or more advertisements, notifications, and/or other replacement content.

At operation 726A, the playlist service generates and transmits, to the first video player, first instructions (e.g., a first variant playlist) to play the first portion of first streaming video content, followed by the second streaming video content, followed by the third portion of first streaming video content. The second video content may replace the second portion of the first streaming video content that was determined for replacement at operation 714. As set forth above, in some examples, the first instructions may include one or more segment names that are encrypted. Additionally, in some examples, the first instructions may include one or more session-specific segment names. For example, one or more video segments may be indicated in both the first instructions and the second instructions sent to the second video player (described below) and may be assigned a different segment name in the first instructions than in the second instructions.

At operation 728A, the first portion of the first streaming video content, the second streaming video content, and the third portion of first streaming video content are transmitted to the second video player. For example, the second video player may request and fetch the first portion of the first streaming video content, the second streaming video content, and the third portion of first streaming video content based on the first instructions provided at operation 726A. In some examples, the second streaming video content may be encoded (e.g., transcoded), prior to selection of the second video content for the first video player, into a plurality of renditions having different respective image qualities, and the plurality of renditions may be stored, for example such as shown in FIG. 4 and described above. In some examples, this may allow the second video content to be fetched on-demand by the first video player and to be transmitted with an image quality that is suited for characteristics of the first video player and/or that is the same (or similar to) the image quality of the first streaming video content transmitted to the first video player.

Figure 8:
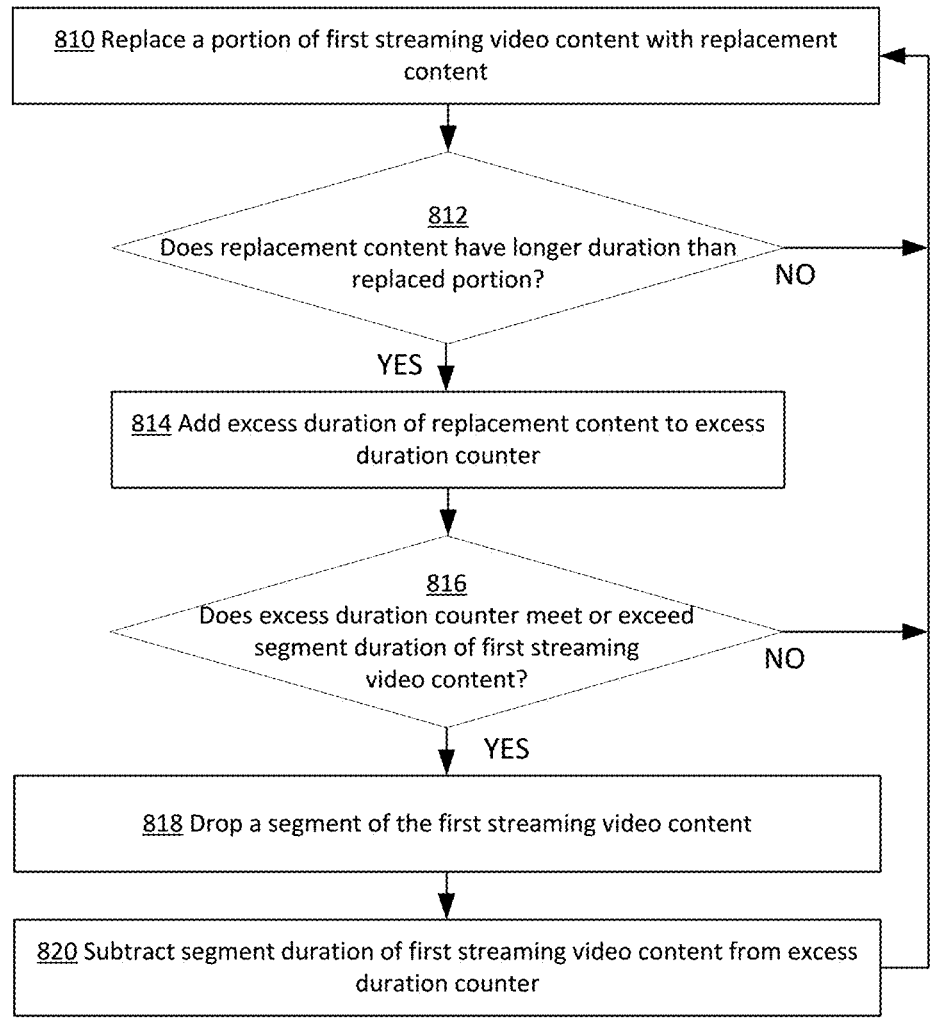
FIG. 8 is a flowchart illustrating an example process for latency reduction by way of segment dropping that may be used in accordance with the present disclosure.
Figure 9:
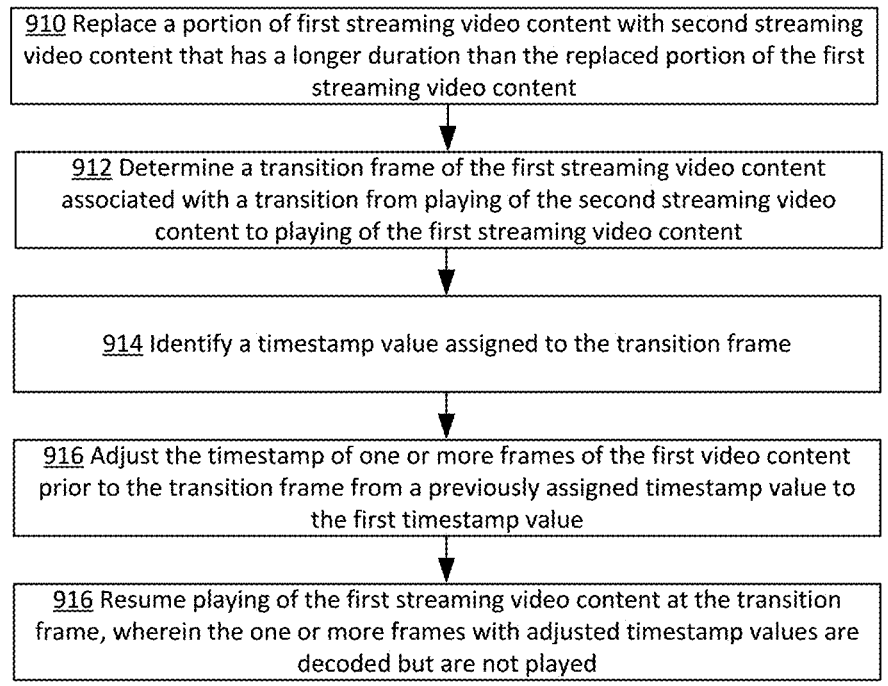
FIG. 9 is a flowchart illustrating an example process for latency reduction by way of timestamp adjustment that may be used in accordance with the present disclosure.

At operation 730A, for cases in which a duration of the second streaming video content (i.e., the replacement content) exceeds a duration of the second portion of the first streaming video content (i.e., the replaced content), a latency reduction may be performed. For example, as set forth above, a segment duration of the first streaming video content and the second streaming video content may sometimes not be the same. In some scenarios, this may cause the duration of the replacement content to be different from the duration of the replaced content. In some examples, in these scenarios, the replacement content may sometimes be selected to have a duration that exceeds the duration of the replaced content. Also, in some examples, the duration of the second streaming video content (i.e., the replacement content) may be limited to exceeding a duration of the second portion of the first streaming video content (i.e., the replaced content) by no more than a segment duration of the first streaming video content. Thus, in some examples, the duration of the second streaming video content (i.e., the replacement content) may exceed the duration of the second portion of the first streaming video content (i.e., the replaced content) by a first excess duration. The first excess duration may introduce a first latency into the playing of the first streaming video content by the first video player. In this scenario, various techniques may be performed remove at least part of the first latency from at least part of the first streaming video content that is played subsequent to the second streaming video content. For example, in some cases, one or more frames of the first streaming video content may be dropped from the playing of the first streaming video content by the first video player. Also, in some cases, a rate at which one or more frames of the first streaming video content are played by the first video player may be increased, for example relative to the rate of playing of other frames of the first streaming video content. Additionally, in some cases, latency may be reduced by dropping a segment of the first streaming video content, for example as shown in FIG. 8 and described below. Furthermore, in some cases, latency may be reduced by adjusting timestamps of the first streaming video content, for example as shown in FIG. 9 and described below.

As shown in FIG. 7, operations 720A-730A may be performed for a first video player, and respective operations 720B-730B may be performed for a second video player. Operations 720B-730B may be performed using similar techniques as operations 720A-730A described above, and are therefore not described in detail. In particular, at operation 720B, the playlist service receives a second variant playlist request from the second video player. In some examples, operation 720B may include receiving an indication of one or more characteristics associated with the second video player, which may be included in (or otherwise indicated by) the second variant playlist request. At operation 722B, the playlist service requests a selection of replacement video content for the second player. For example, the playlist service may issue a request, based at least in part on the master playlist, for the selection that includes one or more characteristics of the first streaming video content, one or more characteristics of the second video player, a duration of the replacement and/or other information. At operation 724B, the playlist service receives a selection of third streaming video content as a replacement for the second video player. In some examples, the third streaming video content may be selected as a replacement based, at least in part, on one or more characteristics of the first streaming video content, one or more characteristics of the second video player, a duration of the replacement and/or other information. In some examples, the third streaming video content may include one or more advertisements, notifications, and/or other replacement content. In some examples, the third streaming video content may be at least partially different from the second streaming video content selected as a replacement for the first video player. At operation 726B, the playlist service generates and transmits, to the second video player, second instructions (e.g., a second variant playlist) to play the first portion of first streaming video content, followed by the third streaming video content, followed by the third portion of first streaming video content. The third video content may replace the second portion of the first streaming video content that was determined for replacement at operation 714. At operation 728B, the first portion of the first streaming video content, the third streaming video content, and the third portion of first streaming video content are transmitted to the second video player. At operation 730B, for cases in which a duration of the third streaming video content (i.e., the replacement content) exceeds a duration of the second portion of the first streaming video content (i.e., the replaced content), a latency reduction may be performed, for example as described at operation 730A above and/or as shown in FIGS. 8-9 and described below.

FIG. 8 is a flowchart illustrating an example process for latency reduction by way of segment dropping that may be used in accordance with the present disclosure. As shown, the process of FIG. 8 may begin at operation 810, at which a portion of first streaming video content is replaced with replacement video content. For example, in some cases, the first iteration of operation 810 may include replacing a second portion of the first streaming video content with second streaming video content, such as described above with reference to operations 720A-730A. One example of such a replacement is shown in diagram 505 of FIG. 5, in which primary segments 512 and 513 are replaced by replacement segments 541 and 542.

At operation 812, it is determined whether the replacement content has a longer duration then the replaced content. As set forth above, in some examples, a segment duration of the selected replacement content and the replaced content may sometimes not be the same. In some scenarios, this may cause the duration of the replacement content to be different from the duration of the replaced content. In some examples, in these scenarios, the replacement content may sometimes be selected to have a duration that exceeds the duration of the replaced content by no more than the segment duration of the replaced content. If the durations of the replacement content and the replaced content are equal, then the process returns to operation 810. If the duration of the replacement content exceeds the duration of the replaced content, then the process proceeds to operation 814, at which the excess duration of the replacement content is added to an excess duration counter that reflects a total excess duration across multiple replacements. For example, in diagram 505 the total duration of replacement segments 541 and 542 (eight seconds) exceeds a total duration of replaced primary segments 512 and 513 (six seconds) by a first excess duration of two seconds. Thus, in this example, two seconds may be added to the excess duration counter at operation 814.

At operation 816, it is determined whether the excess duration counter meets or exceeds a segment duration of the first streaming video content. If not, then the process returns to operation 810. For example, the two second duration added as a result of replacing primary segments 512 and 513 with replacement segments 541 and 542 does not exceed the primary content segment duration of three seconds. Thus, in this example, the process will return from operation 816 to operation 810. On a second iteration of operation 810, instructions may be transmitted to the first video player to play third streaming video content that replaces a fourth portion of the first streaming video content. One example of such a replacement is shown in diagram 505 of FIG. 5, in which primary segment 516 is replaced by replacement segment 543. The total duration of replacement segment 543 (four seconds) exceeds a total duration of replaced primary segment 516 (three seconds) by a second excess duration of one second. Thus, in this example, one second may be added to the excess duration counter on the second iteration of operation 814. Additionally, in this example, on the second iteration of operation 816, it may be determined that the sum of the first excess duration (two seconds) and the second excess duration (one second) stored in the excess duration counter is equivalent to the segment duration of the first streaming video content (three seconds). Thus, in this example, the process may proceed from operation 816 to operation 818, at which a segment of the first streaming video content may be dropped, for example from playing by the first video player. For example, in diagram 505, primary segment 517 is dropped from playing of the primary video content. This dropping may be performed, based at least in part, on determining, at operation 816, that the excess duration counter meets or exceeds the segment duration of the first streaming video content. At operation 820, the segment duration of the first streaming video content may be subtracted from the excess duration counter in order to reflect the dropping of the segment at operation 818. The process then returns to operation 810.

FIG. 9 is a flowchart illustrating an example process for latency reduction by way of timestamp adjustment that may be used in accordance with the present disclosure. As shown, the process of FIG. 9 may begin at operation 910, at which a portion of first streaming video content is replaced with second streaming video content that has a longer duration than the replaced portion of the first streaming video content. For example, as shown in FIG. 6, primary segment 607, having a duration of four seconds, may be replaced by replacement segment 611, having a duration of six seconds. At operation 912, a transition frame of the first streaming video content associated with a transition from playing of the second streaming video content to playing of the first streaming video content is determined. For example, as shown in FIG. 6, transition point 651 indicates a transition from playing of the replacement video content to playing of the primary video content. The frame immediately following the transition point 651 (e.g., the third frame of primary segment 608) is, therefore, determined to be the transition frame.

At operation 914, a timestamp value assigned to the transition frame is identified. For example, as shown in FIG. 6, a timestamp value 630 is assigned to the transition frame (e.g., the third frame of segment 608). At operation 916, the timestamp of one or more frames of the first streaming video content prior to the transition frame are adjusted from a previous value to the value of the transition frame. For example, timestamps may be adjusted for each frame prior to the transition frame in the same segment as the transition frame. As shown in FIG. 6, a timestamp value of the first frame in segment 608 is adjusted from a value of 628 to a value of 630. Additionally, a timestamp value of the second frame in segment 608 is adjusted from a value of 629 to a value of 630. This timestamp adjustment causes the two frames with adjusted timestamp values to be decoded more quickly than the other primary content frames (e.g., at faster than real-time), which removes the latency introduced by the replacement of primary segment 607. At operation 916, playing of the first streaming video content is resumed at the transition frame. For example, in FIG. 6, the display of the primary content may resume at the transition frame (e.g., the third frame in segment 608). Additionally, the one or more frames with adjusted timestamp values (e.g., the first and second frames in segment 608) may not displayed by the video player.

Figure 10:
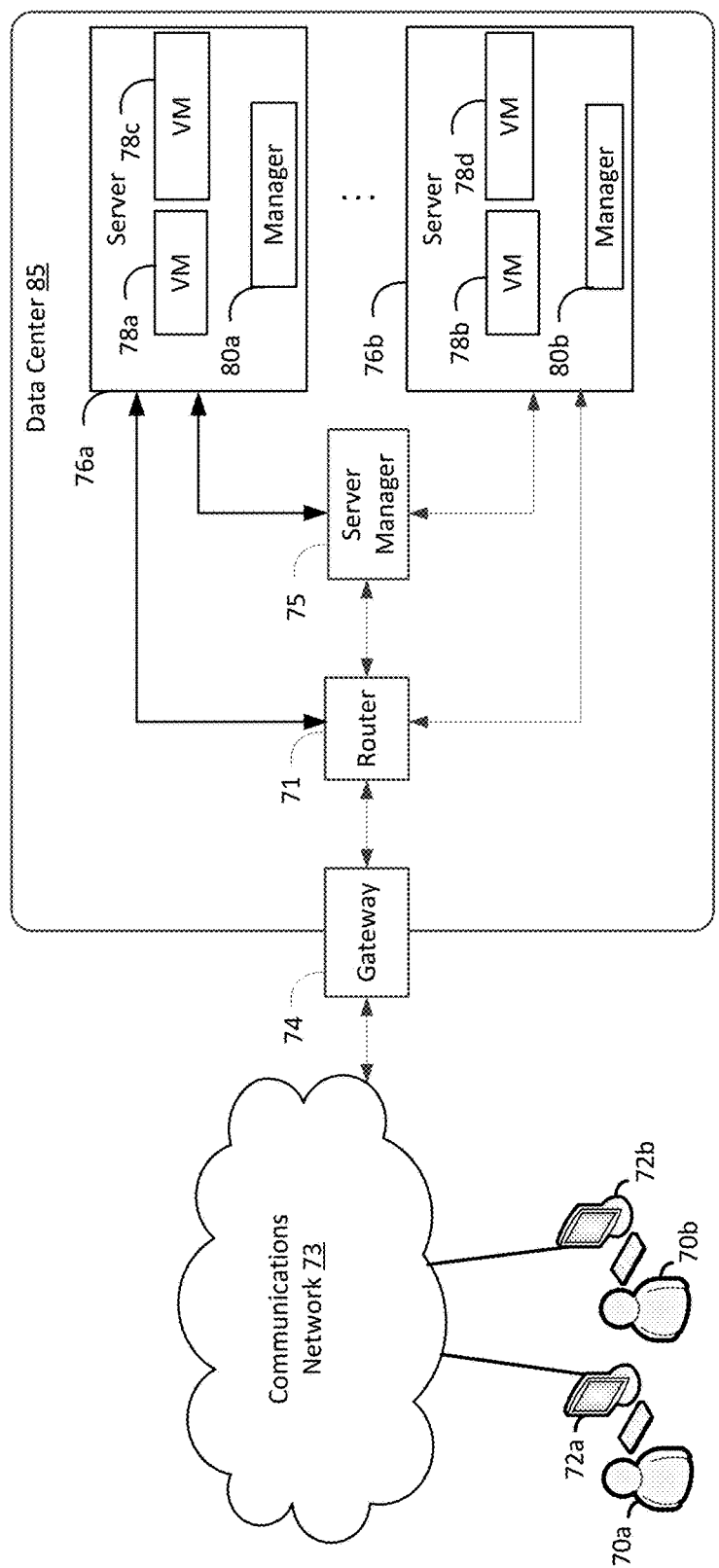
FIG. 10 is a diagram illustrating an example system for transmitting and providing data that may be used in accordance with the present disclosure.

An example system for transmitting and providing data will now be described in detail. In particular, FIG. 10 illustrates an example computing environment in which the embodiments described herein may be implemented. FIG. 10 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as VM instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as VM instances 78a-d (which may be referred herein singularly as VM instance 78 or in the plural as VM instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more VM instances hosted by the physical computing device. A VM instance may be a software emulation of a particular physical computing system that acts as a distinct logical computing system. Such a VM instance provides isolation among multiple operating systems sharing a given physical computing resource. Furthermore, some virtualization technologies may provide virtual resources that span one or more physical resources, such as a single VM instance with multiple virtual processors that span multiple distinct physical computing systems.

Referring to FIG. 10, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 10 may be servers configured appropriately for providing the computing resources described above and may provide computing resources for executing one or more web services and/or applications. In one embodiment, the computing resources may be VM instances 78. In the example of VM instances, each of the servers 76 may be configured to execute an instance manager 80a or 80b (which may be referred herein singularly as instance manager 80 or in the plural as instance managers 80) capable of executing the VM instances 78. The instance managers 80 may be a VM monitor (VMM) or another type of program configured to enable the execution of VM instances 78 on server 76, for example. As discussed above, each of the VM instances 78 may be configured to execute all or a portion of an application.

It should be appreciated that although the embodiments disclosed above discuss the context of VM instances, other types of implementations can be utilized with the concepts and technologies disclosed herein. For example, the embodiments disclosed herein might also be utilized with computing systems that do not utilize VM instances.

In the example data center 85 shown in FIG. 10, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 10, a server manager 75 is also employed to at least in part direct various communications to, from and/or between servers 76a and 76b. While FIG. 10 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 85 described in FIG. 10 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 11:
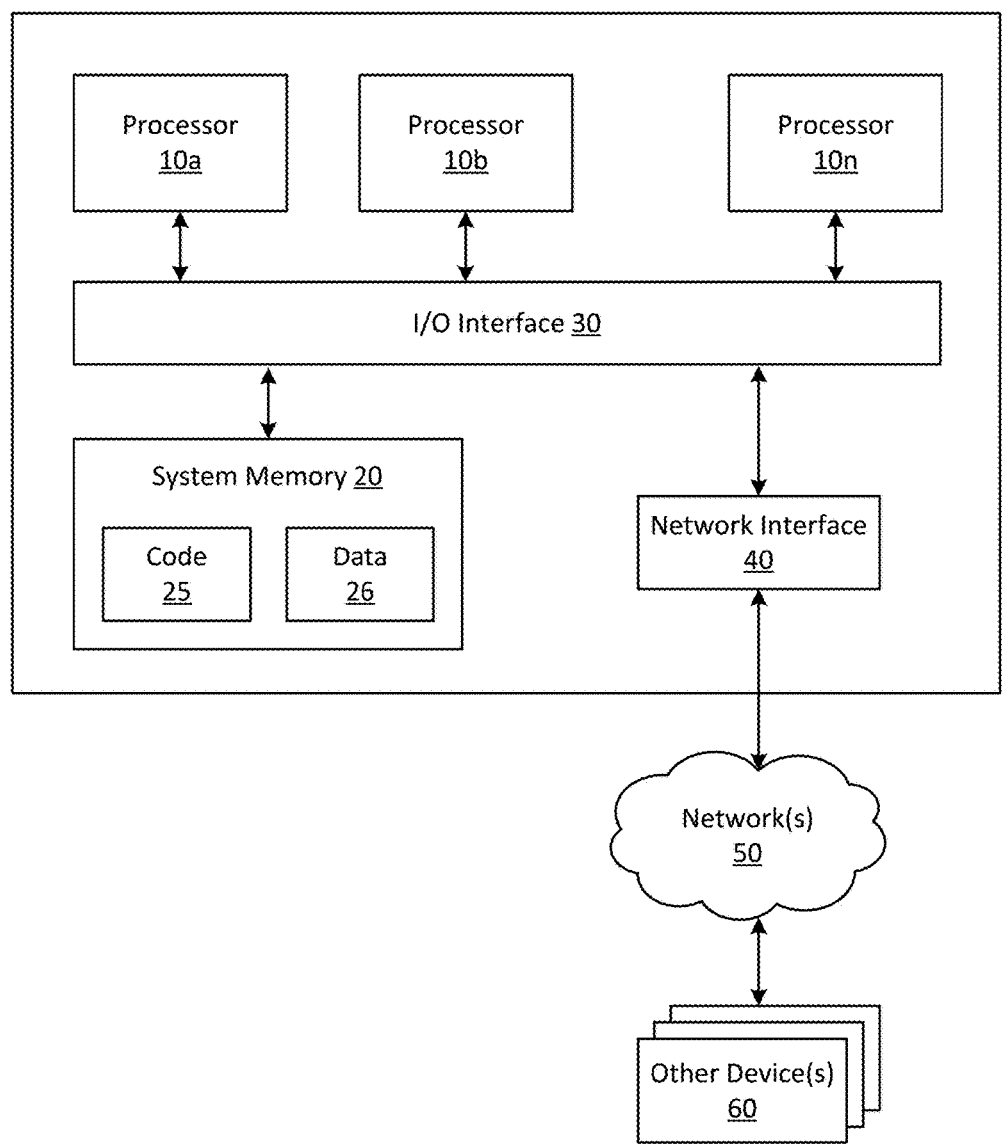
FIG. 11 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 11 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA.

In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, VMs, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ VMs (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a VM instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for live streaming video content replacement comprising:
   one or more processors; and
   one or more memories having stored therein instructions that, upon execution by the one or more processors, cause the computing system perform operations comprising:
      receiving information indicating one or more first characteristics associated with a first video player;
      receiving information indicating one or more second characteristics associated with a second video player;
      transmitting, to the first video player, first instructions to play a first portion of first live streaming video content, followed by second streaming video content, followed by a third portion of the first live streaming video content, wherein the second streaming video content replaces a second portion of the first live streaming video content, and wherein the second streaming video content is selected for the first video player based, at least in part, on the one or more first characteristics;
      transmitting, to the first video player, the first portion of first live streaming video content, the second streaming video content, and the third portion of the first live streaming video content;
      transmitting, to the second video player, second instructions to play the first portion of the first live streaming video content, followed by third streaming video content, followed by the third portion of the first live streaming video content, wherein the third streaming video content replaces the second portion of the first live streaming video content, and wherein the third streaming video content is selected for the second video player based, at least in part, on the one or more second characteristics; and
      transmitting, to the second video player, the first portion of first live streaming video content, the third streaming video content, and the third portion of the first live streaming video content.

2. The computing system of claim 1, wherein the one or more first characteristics comprise at least one of a version of the first video player, characteristics of a computer system on which the first video player executes, or characteristics of a viewer that operates the first video player.

3. The computing system of claim 1, wherein the second streaming video content is further selected based, at least in part, on one or more characteristics associated with the first streaming video content.

4. The computing system of claim 3, wherein the one or more characteristics associated with the first streaming video content comprise at least one of a channel on which the first streaming video content is transmitted, one or more characteristics of a provider of the first streaming video content, or a maturity rating for the first streaming video content.

5. A computer-implemented method for live streaming video content replacement comprising:
   receiving, by one or more computing devices, information indicating one or more first characteristics associated with a first video player;
   transmitting, by the one or more computing devices, to the first video player, first instructions to play a first portion of first live streaming video content, followed by second streaming video content, followed by a third portion of the first live streaming video content, wherein the second streaming video content replaces a second portion of the first live streaming video content, and wherein the second streaming video content is selected for the first video player based, at least in part, on the one or more first characteristics; and
   transmitting, by the one or more computing devices, to the first video player, the first portion of first live streaming video content, the second streaming video content, and the third portion of the first live streaming video content.

6. The computer-implemented method of claim 5, further comprising:
   encoding, prior to selection of the second video content for the first video player, the second video content into a plurality of renditions having different respective image qualities; and
   storing the plurality of renditions.

7. The computer-implemented method of claim 5, further comprising:
   receiving information indicating one or more second characteristics associated with a second video player;
   transmitting, to the second video player, second instructions to play the first portion of the first live streaming video content, followed by third streaming video content, followed by the third portion of the first live streaming video content, wherein the third streaming video content replaces the second portion of the first live streaming video content, and wherein the third streaming video content is selected for the second video player based, at least in part, on the one or more second characteristics; and
   transmitting, to the second video player, the first portion of first live streaming video content, the third streaming video content, and the third portion of the first live streaming video content.

8. The computer-implemented method of claim 7, wherein at least one segment of video content is indicated in both the first instructions transmitted to the first video player and the second instructions transmitted to the second video player and is assigned a different segment name in the first instructions than the second instructions.

9. The computer-implemented method of claim 7, further comprising:
   generating a master playlist that indicates the first portion of the first live streaming video content, the second portion of the first live streaming video content, and the third portion of the first live streaming video content and that indicates that the second portion is selected for replacement; and
   providing the master playlist to a service that requests, based at least in part on the master playlist, selection of the second streaming video content for the first video player and selection of the third streaming video content for the second video player and that generates the first instructions and the second instructions.

10. The computer-implemented method of claim 5, wherein the one or more first characteristics comprise at least one of a version of the first video player, characteristics of a computer system on which the first video player executes, or characteristics of a viewer that operates the first video player.

11. The computer-implemented method of claim 5, wherein the second streaming video content is further selected based, at least in part, on one or more characteristics associated with the first live streaming video content.

12. The computer-implemented method of claim 11, wherein the one or more characteristics associated with the first live streaming video content comprise at least one of a channel on which the first live streaming video content is transmitted, one or more characteristics of a provider of the first live streaming video content, or a maturity rating for the first live streaming video content.

13. The computer-implemented method of claim 5, wherein the first instructions transmitted to the first video player include at least one encrypted segment name.

14. The computer-implemented method of claim 13, wherein the encrypted segment name includes encrypted data that represents at least one of characteristics of a request for an associated segment, characteristics of an associated session, characteristics of an associated stream, or a uniform resource identifier for the associated segment.

15. The computer-implemented method of claim 13, wherein the encrypted segment name is encrypted using symmetric key encryption and a Galois/Counter Mode of Advanced Encryption Standard (GCM-AES) cipher.

16. One or more non-transitory computer-readable storage media having stored thereon instructions that, upon execution by one or more computing devices, cause the one or more computing devices to perform operations comprising:
  receiving, by the one or more computing devices, information indicating one or more first characteristics associated with a first video player;
  transmitting, by the one or more computing devices, to the first video player first instructions to play a first portion of first live streaming video content, followed by second streaming video content, followed by a third portion of the first live streaming video content, wherein the second streaming video content replaces a second portion of the first live streaming video content, and wherein the second streaming video content is selected for the first video player based, at least in part, on the one or more first characteristics; and
  transmitting, by the one or more computing devices, to the first video player, the first portion of first live streaming video content, the second streaming video content, and the third portion of the first live streaming video content.

17. The one or more non-transitory computer-readable storage media of claim 16, wherein the operations further comprise:
  receiving information indicating one or more second characteristics associated with a second video player;
  transmitting, to the second video player, second instructions to play the first portion of the first live streaming video content, followed by third streaming video content, followed by the third portion of the first live streaming video content, wherein the third streaming video content replaces the second portion of the first live streaming video content, and wherein the third streaming video content is selected for the second video player based, at least in part, on the one or more second characteristics; and
  transmitting, to the second video player, the first portion of first live streaming video content, the third streaming video content, and the third portion of the first live streaming video content.

18. The one or more non-transitory computer-readable storage media of claim 16, wherein the one or more first characteristics comprise at least one of a version of the first video player, characteristics of a computer system on which the first video player executes, or characteristics of a viewer that operates the first video player.

19. The one or more non-transitory computer-readable storage media of claim 16, wherein the second streaming video content is further selected based, at least in part, on one or more characteristics associated with the first live streaming video content.

* * * * *